United States Patent [19]

Sato et al.

[11] 4,399,445

[45] Aug. 16, 1983

[54] RECORDER FOR AN UNDERWATER DETECTION SYSTEM

[75] Inventors: Yuji Sato; Shoji Koizumi, both of Kobe, Japan

[73] Assignee: Furuno Electric Co., Ltd., Nishinomiya, Japan

[21] Appl. No.: 198,033

[22] Filed: Oct. 17, 1980

[30] Foreign Application Priority Data

Oct. 30, 1979 [JP] Japan .............................. 54-140922
Oct. 30, 1979 [JP] Japan .............................. 54-140924
Oct. 30, 1979 [JP] Japan .............................. 54-140925

[51] Int. Cl.³ .......................................... G01D 15/24
[52] U.S. Cl. .................................. 346/136; 242/67.3 R
[58] Field of Search ............... 346/136, 145, 33 EC; 242/67.3 R, 67.2, 67.1 R, 67.1 D, 67.3 F

[56] References Cited

U.S. PATENT DOCUMENTS 2,902,332  9/1959  Bauer .............................. 346/145 X
2,913,299 11/1959  Clift, Jr. ........................... 346/136 X
3,216,021 11/1965  Stefansson ....................... 346/136
3,705,425 12/1972  Packel ............................. 346/136 X Primary Examiner—G. Z. Rubinson
Assistant Examiner—W. J. Brady
Attorney, Agent, or Firm—Jordan and Hamburg

[57] ABSTRACT

The present invention is directed to a recording apparatus comprising feeding and receiving means for recording paper that are positioned under a recording surface and rollers, whereby either the feeding means and/or the receiving means can be removed from or installed through the top of the recording apparatus for changing the recording paper.

37 Claims, 12 Drawing Figures

RECORDER FOR AN UNDERWATER DETECTION SYSTEM

BACKGROUND OF THE INVENTION

The present invention relates to a recorder having a feed member and a take-up member positioned under stretched recording paper extended about a supporting member having a curved surface and a roller, having the recording paper drawn out of a paper roll mounted on the feed member and passed over the supporting member, the roller and wound on the take-up member, and having at least one recording means moving across the width of the recording paper which is moved progressively lengthwise in a direction perpendicular to the direction of recording means scan. Particularly, it relates to a recorder which simultaneously displaces the supporting member and the roller to uncover the feed member and the take-up member so that easy access to the feed and take-up members is attained from an above direction of the extended recording paper, and hence a used paper roll can be easily replaced with a new one.

Hereinafter, the present invention will be explained as embodied in the recorder utilized in an underwater detection system as an echo sounder, although the invention is not limited to that particular system.

Such a recorder as shown in FIG. 1 has been proposed and widely used in echo sounding systems.

Referring to FIGS. 1 and 2, a stylus assembly 1 comprises a conducting piece fastened to an endless belt 2, a recording stylus 3 fixed to one end of the conducting piece and a collector stylus 3 fixed to the other end thereof. The collector stylus 4 slides on a contact rail 5 to which received echo signals are applied, while the recording stylus 3 moves across the width of electrically sensitive recording paper 6 which is moved progressively lengthwise in a direction perpendicular to the direction of stylus scan. The endless belt 2 is extended about a driving pulley 7 and a driven pulley 8, and is driven at uniform speed by the motor through the reduction gear mechanism both contained in a box 9, a driving shaft 10 and the driving pulley 7. Thus, the recording stylus 3 repeatedly moves across the recording paper 6 in synchronism with the sequence of the sonar signals transmitted in the water, so that a profile of the bottom of the sea and fish schools, etc., are recorded on the paper 6. A pulling roller 12 is rotatably supported by vertical support plates 11, 11' which stand parallel with each other, and driven to rotate by the motor through the gear mechanism contained in the box 9. A pressing roller 13 is rotatably maintained by the vertical plates 11, 11' and is adapted to press the recording paper against the pulling roller 12. A cover plate 15 is horizontally maintained between the plates 11, 11' and can be turned up around the axis of the pulling roller 12 in the direction of an arrow A, and can be held vertical as shown in FIG. 2. A sending roller 18 is rotatably supported by the plate 15 at a right-hand end thereof. Two pairs of suspension plates 19, 19' are respectively fixed to the plate thereunder at appropriate places distanced apart from one another. A feed reel 20 and a take-up reel 14 are respectively rotatably and demountably supported by the pairs of the suspension plates 19, 19'. The recording paper 6 is drawn out of the paper roll mounted on the feed reel 20 over the sending roller 18 and the cover plate 15, and passed between the pulling and pressing rollers 12, 13 and wound on the take-up reel 14. Thus, in order to get a wide view of the underwater conditions recorded on the extended recording paper, the feed reel 20 and take-up reel 14 are arranged to be underneath the recording paper extended about the sending and pulling rollers 18, 12 so that the sending and pulling rollers are positioned as distantly as possible from one another.

When desiring to replace a used paper roll with a new one, or desiring to set a new paper roll on the feed reel 20 positioned under the cover plate 15, the plate 15 must be turned up about the axis of the pulling roller 12 and held vertically as shown in FIG. 2. The feed reel 20 is taken out from a right-hand direction, and re-installed in the pair of suspension plates 19' after a new paper roll is mounted thereon. The end of the recording paper is then drawn out of the new paper roll over the sending roller 18 and the cover plate 15, passed between the pulling and pressing rollers 12, 13, and fixed to the take-up reel 14. The cover plate 15 is turned in a clockwise direction so that the recorder is restored to a normal writing operational mode.

As is easily understood, it is troublesome to approach both the feed and take-up reels 20, 14 from a lateral direction (not from an above direction), to pass the end of the recording paper drawn out of the paper roll mounted on the feed reel 20 between the pulling and pressing rollers 12, 13 narrowly spaced therebetween, and to engage the end of the paper to the take-up reel from the lateral direction. Further, it should be noted that the recording paper must be handled on both sides of the erected cover plate 15.

Accordingly, an object of the invention is to provide a recorder having the feed member and the take-up member positioned under extended recording paper in which new recording paper can easily be set in place therein.

Another object of the invention is to provide a recorder in which new recording paper can be settled therein from only one direction.

Another object of the invention is to provide a recorder in which new recording paper can be settled therein from an above direction of extended recording paper.

Another object of the invention is to provide a recorder in which sending and pulling rollers are simultaneously displaced to uncover a feed member and a take-up member by merely raising or lowering the lug connected to a cover plate.

Another object of the invention is to provide a recorder in which the distance between pulling and pressing rollers is considerably increased so that recording paper can be easily passed therebetween.

Another object of the invention is to provide a recorder in which a feed member and a take-up member are brought up above the case of the recorder and exposed.

SUMMARY OF THE INVENTION

In order to achieve these and other objects of the invention, a recorder is provided which has a feed member and a take-up member positioned under the stretched recording paper extended about a supporting member having a curved surface and a roller, has the recording paper drawn out of the paper roll mounted on the feed member and passed over the supporting member, the roller and wound on the take-up member, and has at least one recording means moving across the width of the recording paper which is moved progressively lengthwise in a direction perpendicular to the direction of recording means scan, the improvements characterized by means for holding and simultaneously moving the supporting member and the roller so that the feed member and/or the take-up member can be taken out of or installed in the recorder from the upper side of the extended recording paper.

Other objects and features of the present invention will be described in more detail herein with reference to the accompanying drawings.

BRIEF DESCRIPTION OF THE DRAWINGS

Throughout the drawings, the same reference numerals are given to like components.

DESCRIPTION OF THE PREFERRED EMBODIMENTS

Figure 1:
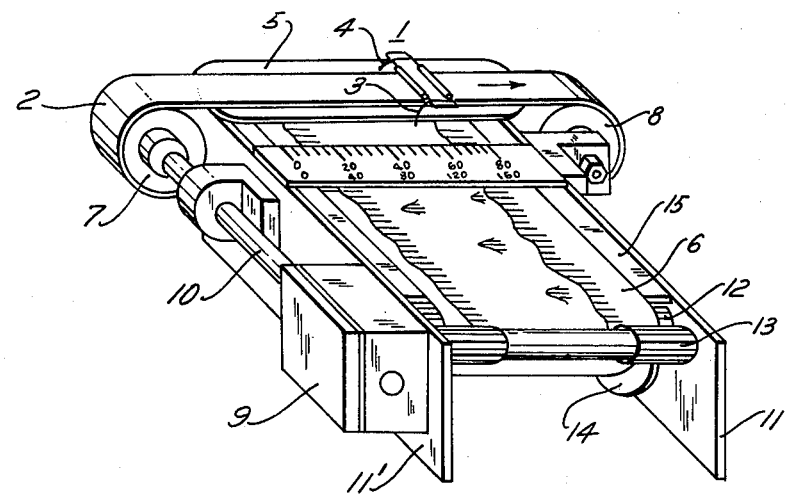
FIG. 1 is a perspective view of a known recorder.
Figure 2:
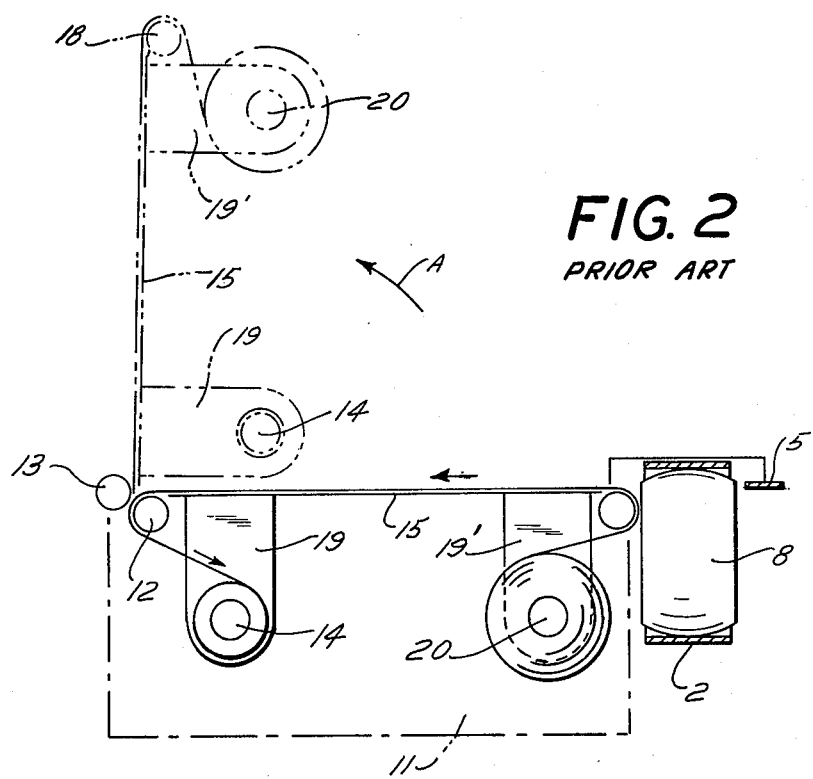
FIG. 2 is a simplified sectional side view of the known recorder shown in FIG. 1, in which its cover plate can be rotated around the axis of a pulling roller.
Figure 3:
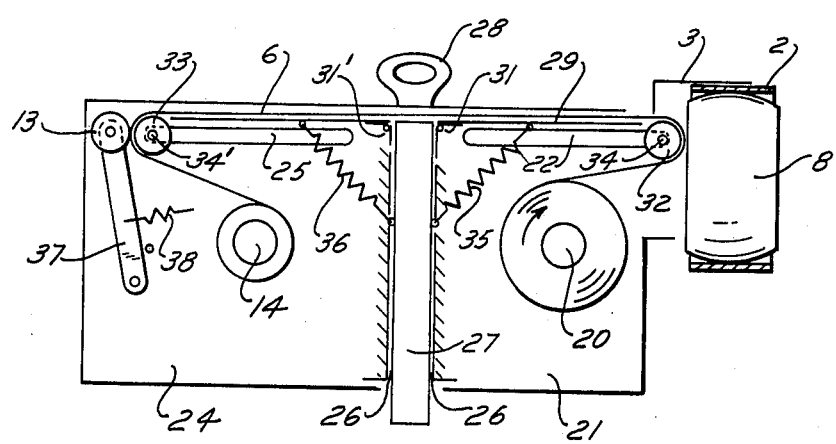
FIG. 3 is a simplified sectional side view of a recorder according to a first embodiment of the invention.
Figure 4:
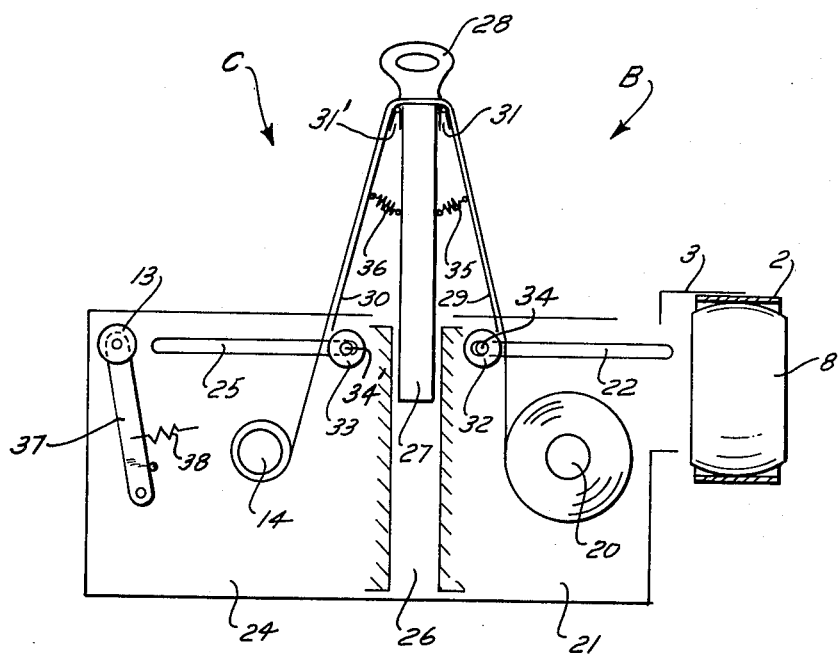
FIG. 4 is a simplified sectional side view of the recorder shown in FIG. 3, when a new paper roll is to be set therein.

Referring to FIGS. 3 and 4, a feed member, for example the feed reel 20, is rotatably demountably supported by vertical support plates 21, 21' (hidden from view) therebetween which stand, with one facing the other, in parallel with each other and respectively having long horizontal openings 22 at the same upper portions thereof. A take-up member, for example the take-up reel 14, is rotatably demountably supported by vertical support plates 24, 24' (hidden from view) therebetween which also have long horizontal openings 25. The left-hand end portions of the plates 21, 21' and the right-hand end portions of the plates 24, 24' form a vertical guide opening 26. A moving support member 27 shaped, for example as a rectangular paraellelpiped, is vertically moved in the vertical guide opening 26 by raising or lowering a lug 28 attached to the upper end thereof. Cover plates 29, 30 are respectively positioned over the feed reel 20 and the take-up reel 14. Ends of the cover plates 29, 30 are respectively connected to both sides of the moving support member 27 at the upper end portion thereof by means of flexible coupling means, for example hinged joints 31, 31'. Sending and pulling rollers 32, 33 are respectively rotatably supported by the cover plates 29, 30 at the other ends thereof, and have respective guide pins 34, 34' at those ends which move in the horizontal openings 22, 25 respectively. It should be noted that the guide pins can also be fixed to both sides of the cover plates 29, 30. A spring 35 is slantingly extended from the underside of the cover plate 29 to the side of the moving support member 27, thereby always creating a force to pull plate 29 toward the support member 27. A spring 36 is extended from the underside of the cover plate 30 to the side of the moving support member 27, thereby pulling the plate 30 toward the support member. The pressing roller 13 is rotatably supported by arms 37, and pulled rightward by a spring 38 to press the recording paper against the pulling roller 34.

When new recording paper is required to be set in place in the recorder, the moving support member 27 is initially moved upwardly by lifting the lug 28, thereby respectively moving the sending and pulling rollers 32, 33 inwardly in the horizontal openings 22, 25 so that the cover plates 29, 30 are drawn toward the moving support member 27 by means of the springs 35, 36. Hence, the feed reel 20 and the take-up reel 14 are uncovered. Secondly, the feed reel 20 is taken out of the recorder from the direction of an arrow B, and re-installed therein from the same direction after a new paper roll is mounted on the feed reel 20. An end of the recording paper 6 drawn out of the new paper roll is passed over the sending roller 32, the cover plate 29, the moving support member 27, the cover plate 30 and the pulling roller 33, and fixed to the take-up reel 14 from the direction of an arrow C. Then, the moving support member 27 is lowered by depressing the lug 28, thereby respectively moving the sending and pulling rollers 32, 33 rightwardly and leftwardly so that the recorder is restored to a normal writing operational mode.

Figure 5:
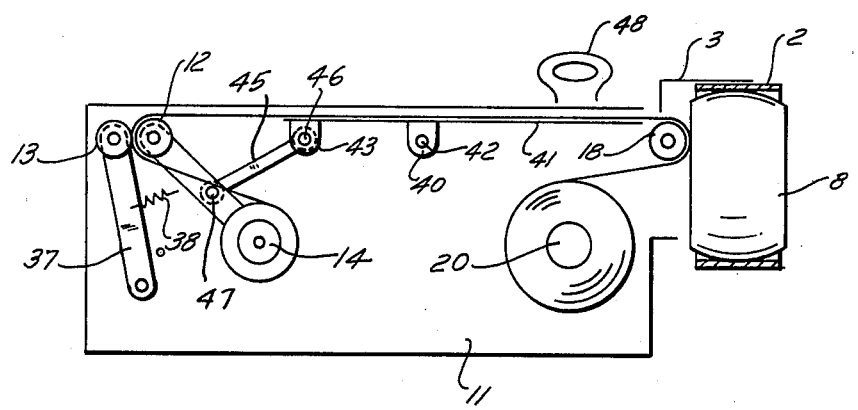
FIG. 5 is a simplified sectional side view of a recorder according to a second embodiment of the invention.
Figure 6:
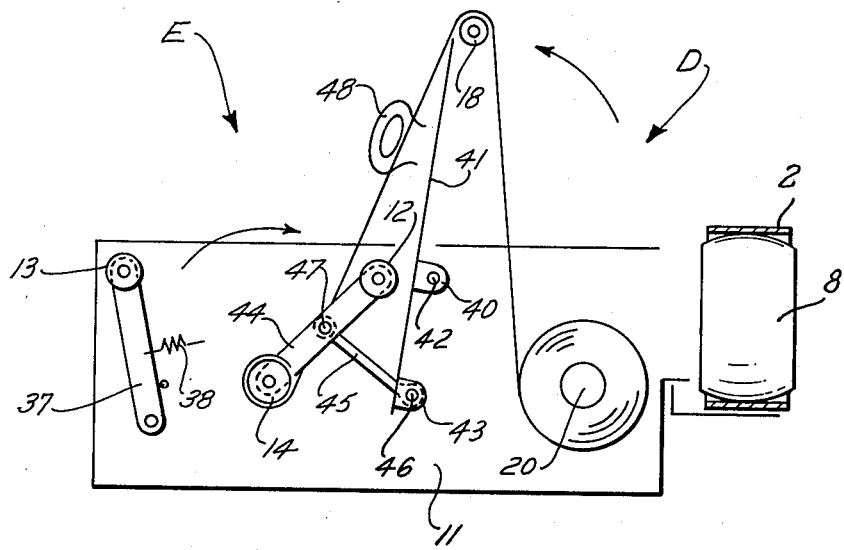
FIG. 6 is a simplified sectional side view of the recorder shown in FIG. 5, when a new paper roll is to be set therein.

Referring to FIGS. 5 and 6, the feed reel 20 and the take-up reel 14 are both rotatably supported by the vertical support plates 11, 11' (hidden from view). Brackets 40 are fixed to the underside of a cover plate 41. A rod 42 is extended through the brackets 40 with both ends respectively fixed to the vertical plates 11, 11' at the upper portions thereof so that the cover plate 41 is rotatably supported. The sending roller 18 is rotatably supported by the cover plate 41 at a right-hand end portion thereof. A bracket 43 is secured to the underside of the cover plate 41 at a left-hand portion thereof. The pulling roller 12 is rotatably supported at the ends of two arms 44 which are rotatable about the axis of the take-up reel 14. The cover plate 41 and the arm 44 are connected by a link bar 45, one end of which is rotatably secured to the bracket 43 by means of a pin 46, and the other end of which is rotatably secured to the arm 44 by a pin 47. A lug 48 is fixed to the side of the cover plate 41.

When it is desired to set new recording paper in place in the recorder, the lug 48 is initially raised so that the cover plate 41 is turned about the rod in a counter clockwise direction and the pulling roller 12 is turned in a clockwise direction. Hence, the feed reel 20 and the take-up reel 14 are uncovered. Secondly, the feed reel 20 is taken out of the recorder from the direction of an arrow D, and re-installed therein from the same direction after a new paper roll is mounted on the feed reel.

An end of the recording paper 6 drawn out of the new paper roll is passed over the sending roller 18, the pulling roller 12, and fixed to the take-up reel 14 from the direction of an arrow E. Then, the cover plate 41 is turned around the rod 42 in a clockwise direction by depressing the lug 48 so that the recorder is restored to a normal writing operational mode.

It should be noted that the feed reel 20 can be demountably rotatably supported by a pair of the suspension plates 19, 19' attached to the underside of the cover plate 41. When the cover plate 41 is turned in a counter clockwise direction in order to mount a new paper roll on the feed reel 20, the feed reel 20 is brought up above the case of the recorder and exposed so that easy access thereto is attained.

Figure 7:
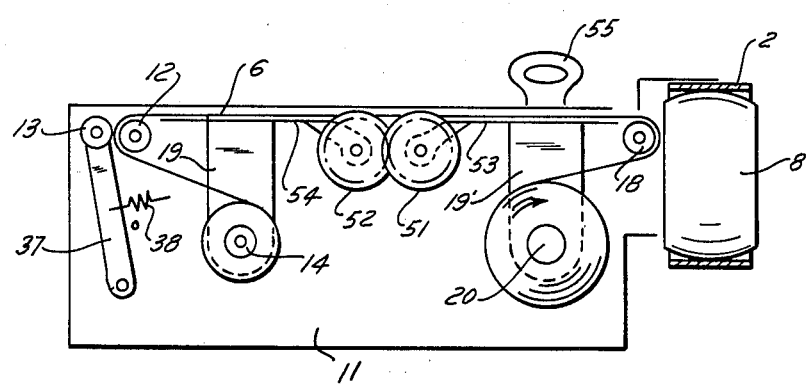
FIG. 7 is a simplified sectional side view of a recorder according to a third embodiment of the invention.
Figure 8:
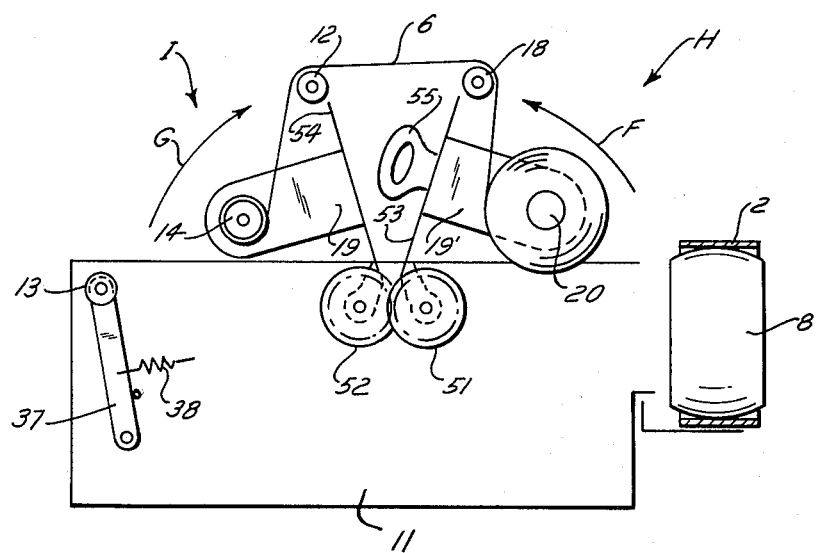
FIG. 8 is a simplified sectional side view of the recorder shown in FIG. 7, when a new paper roll is to be set therein.

Referring to FIGS. 7 and 8, meshing gears 51, 52 are fitted to one end of an axle which is rotatably supported by the vertical support plates 11, 11'. Each cover plate 53 and 54 is fixed at one end thereof to an axle or to the side of each of the gears 52, 51 respectively. The sending roller 18 and the pulling roller 12 are respectively rotatably supported by the cover plates 53, 54 at the other ends thereof. Two pairs of suspension plates 19, 19' are respectively vertically attached to the underside of the cover plates 54, 53. The feed reel 20 and takeup reel 14 are respectively rotatably demountably supported by the pairs of the suspension plates 19', 19. The pressing roller 13 is rotatably supported by the arms 37 and is pulled rightwardly by the spring 38 to press the recording paper against the pulling roller 12. A lug 55 is fixed at one side of the cover plate 53. The recording paper is drawn out of the paper roll mounted on the feed reel 20 and moved over the roller 18, the cover plates 53, 54, the roller 12, and rewound on the take-up reel 14.

When it is desired to set a new paper roll in place in the recorder, the lug is initially raised, thereby respectively turning up the cover plates 53, 54 in the directions of arrows F, G so that the feed reel 20 and take-up reel 14 are raised above the case of the recorder. Thus, easy access to the feed reel or the take-up reel is attained from directions H, I. Secondly, the feed reel 20 is taken out of the vertical suspension plates 19' from the direction of an arrow H and reset in the suspension plates 19' from the same direction after a new paper roll is mounted on the feed reel 20. An end of the recording paper drawn out of the new paper roll is passed over the sending roller 18, the pulling roller 12, and fixed to the take-up reel 14 from the direction of an arrow I. Then, the lug 55 is lowered, thereby turning the cover plates 53, 54 in a clockwise and counter clockwise directions respectively so that the recorder is restored to a normal writing operational mode.

According to the embodiment shown in FIGS. 7 and 8, the feed and take-up reels are raised above the case of the recorder, and hence can be approached by an operator more easily as compared with the embodiments illustrated in FIGS. 3, 4, 5 and 6.

Figure 9:
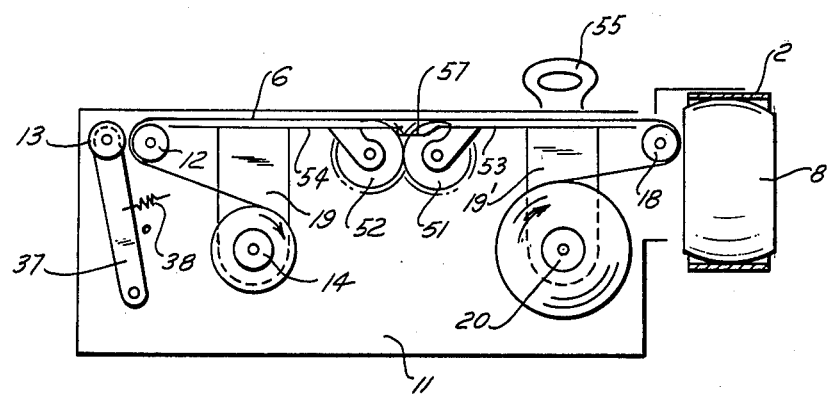
FIG. 9 is a simplified sectional side view of a recorder according to a fourth embodiment of the invention, in which improvements are made to the embodiment shown in FIGS. 7 and 8.
Figure 10:
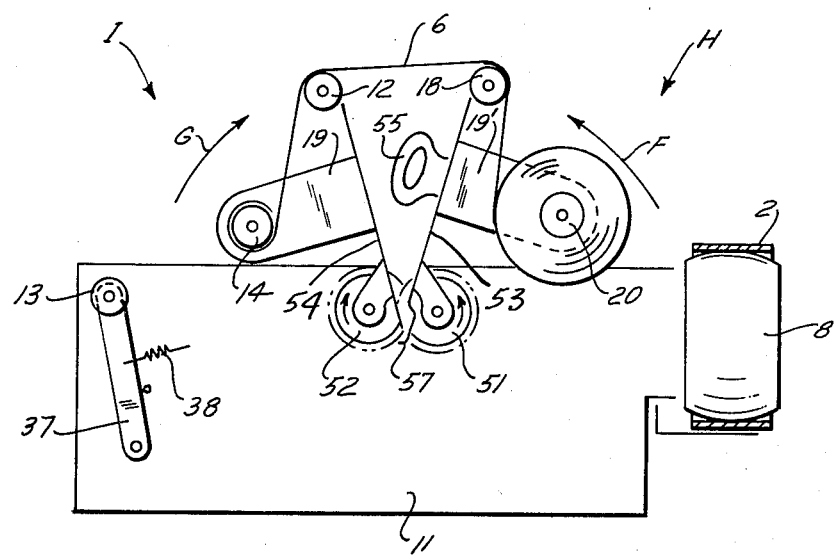
FIG. 10 is a simplified sectional side view of the recorder shown in FIG. 9, when a new paper roll is to be set therein.

Referring to FIGS. 9 and 10, in order to improve the embodiment shown in FIGS. 7 and 8, a curved portion 57 is added to the left-hand end of the cover plate 53, with the rest of the arrangement maintained the same as in the embodiment shown in FIGS. 7 and 8. The edge of the curved portion 57 presses the cover plate 54 upwardly, thereby completely eliminating the longitudinal vibration of the cover plates 53, 54 caused by the backlash of the gears 51, 52. A curved portion can be added to the right-hand end of the cover plate 54 to push the cover plate 53 upwardly too.

Figure 11:
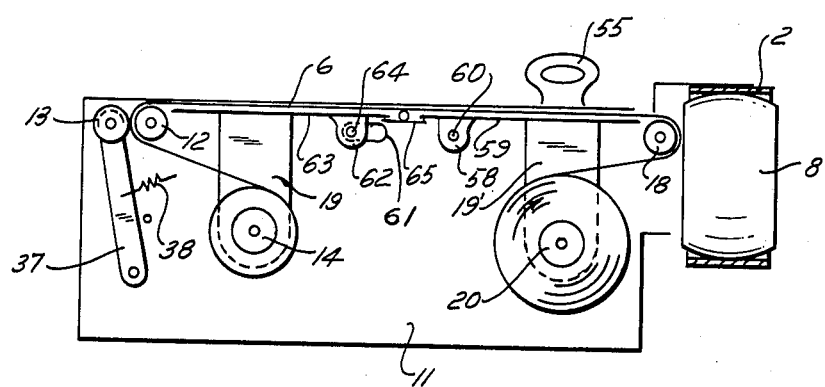
FIG. 11 is a simplified sectional side view of a recorder according to a fifth embodiment of the invention.
Figure 12:
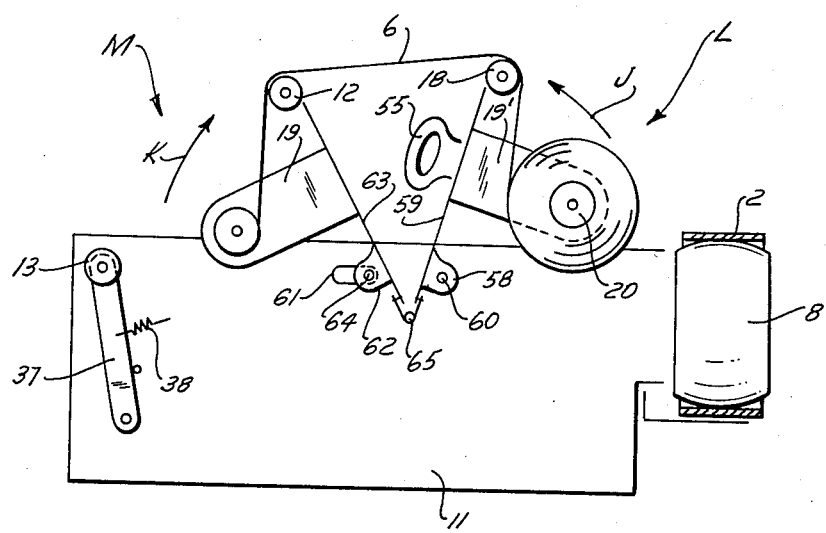
FIG. 12 is a simplified sectional side view of the recorder shown in FIG. 11, when a new paper roll is to be set therein.

Referring to FIGS. 11 and 12, brackets 58 are fixed to the underside of a cover plate 59. A rod 60 is extended through the brackets 58, both ends of which are respectively fixed to the vertical plates 11, 11' at the upper portions thereof so that the cover plate 49 is rotatably supported around the rod 60. Horizontal openings 61 are formed on the vertical plates 11, 11' at the upper portions thereof. Two brackets 62 are fixed to the underside of a cover plate 63, respectively adjacent to the horizontal openings 61. Pins 64 are horizontally outwardly fixed to the brackets 62 so that the pins 64 move horizontally in the openings 61. The cover plates 59, 63 are connected to one another by means of flexible coupling means, for example a hinged joint 65 at the ends thereof. The sending roller 18 and the pulling roller 12 are respectively rotatably supported by the cover plates 59, 63 at the other ends thereof. Two pairs of suspension plates 19, 19' are respectively vertically attached to the underside of the cover plates 63, 59. The feed reel 20 and the take-up reel 14 are respectively demountably supported by the pairs of the suspension plates 19', 19. The pressing roller 13 is rotatably supported by the arms 37 and pulled rightwardly by the spring 38 to press the recording paper against the pulling roller 12. The recording paper is drawn out of the paper roll mounted on the feed reel 20, moved over the roller 18, the cover plates 59, 63, the roller 12, and wound on the take-up reel 14.

When a new paper roll is desired to be set in place in the recorder, the lug 55 is initially raised thereby turning up the cover plate 59 around the rod 60 so that the pins 64 move rightward in the openings 61 and then the cover plate 63 turns around the pin 64 which is stopped in the direction of an arrow K. Consequently, the feed reel 20 and take-up reel 14 are brought up above the case of the recorder and easy access to the feed reel or the take-up reel is accordingly attained from the directions of arrows L, M. Secondly, the feed reel 20 is taken out of the vertical suspension plates 19, 19' from the direction of the arrow L and reset therein from the same direction after a new paper roll is mounted on the feed reel 20. An end of the recording paper drawn out of the new paper roll is passed over the sending and pulling rollers 18, 12, and fixed to the take-up reel 14 from the direction of the arrow M. Then, the lug 55 is lowered, thereby respectively turning the cover plates 59, 63 in a clockwise and counter-clockwise directions so that the recorder is restored to a writing operational mode.

As easily comprehended, the embodiment shown in FIGS. 11 and 12 is more simply constructed as compared with the embodiment shown in FIGS. 7 and 8, since simple elements as the brackets 58, 62, the rod 60, the pins 64, and the openings 61 are used in place of the gears 51, 52.

While the invention has been described in detail and with reference to specific embodiments thereof, it will be apparent to one skilled in the art that various changes and modifications can be made therein without departing from the spirit and scope of the invention.

What is claimed is:

1. A recorder having a feed member and a take-up member positioned under stretched recording paper extending about a supporting member with a curved surface and a roller, the recording paper drawn out of a paper roll mounted on the feed member, progressively passing over the supporting member, the roller and being wound onto the take-up member, and the recorder having at least one recording means moving across the width of the recording paper, the improvments characterized by means for holding and simultaneously moving the supporting member and the roller so that at least one of the feed member and the take-up member can be removed and installed in the recorder from the upper side of the stretched recording paper, in which the holding and moving means comprises:
(i) a vertical guide opening,
(ii) a supporting member adapted to be moved in said vertical guide opening,
(iii) a first supporting means connected to one side of the upper portion of said supporting member at one end thereof by a coupling means and connected to the supporting member with the curved surface at the other end thereof,
(iv) a second supporting means connected to the other side of the upper portion of said supporting member at an end thereof by a coupling means, for supporting the roller at the other end thereof,
(v) horizontal openings formed in vertical plates disposed perpendicularly to the recording means scan and adjacent to the side of said first and second supporting means respectively, and
(vi) pins fixed to at least one of the ends of the supporting member with the curved surface, the roller on said supporting member, and appropriate points on the sides of at least one of said first and second supporting means.

2. A recorder as defined in claim 1 wherein the coupling means comprises a hinged joint.

3. A recorder having a feed member and a take-up member positioned under stretched recording paper extending about a supporting member with a curved surace and a roller, the recording paper drawn out of a paper roll mounted on the feed member, progressively passing over the supporting member, the roller and being wound onto the take-up member, and the recorder having at least one recording means moving across the width of the recording paper, the improvments characterized by means for holding and simultaneously moving the supporting member and the roller so that at least one of the feed member and the take-up member can be removed and installed in the recorder from the upper side of the stretched recording paper, in which the holding and moving means comprises:
(i) a first gear rotatably coupled to a vertical plate placed in a direction perpendicular to the recording means scan,
(ii) a second gear rotatably coupled to said vertical plate and meshed with said first gear,
(iii) a first supporting means affixed to said first gear at one end thereof, for supporting the supporting member with the curved surface at the other end thereof, and
(iv) a second supporting means affixed to said second gear at one end thereof, for supporting the roller at the other end of said second supporting means.

4. A recorder as defined in claim 3 wherein at least one of the first and second supporting means has a portion at the one end thereof to press the other supporting means upwardly when the recorder is set to a writing operational mode.

5. A recorder having a feed member and a take-up member positioned under stretched recording paper extending about a supporting member with a curved surface and a roller, the recording paper drawn out of a paper roll mounted on the feed member, progressively passing over the supporting member, the roller and being wound onto the take-up member, and the recorder having at least one recording means moving across the width of the recording paper, the improvments characterized by means for holding and simultaneously moving the supporting member and the roller so that at least one of the feed member and the take-up member can be removed and installed in the recorder from the upper side of the stretched recording paper, in which the holding and moving means comprises:
(i) a first supporting means rotatably supported by vertical plates therebetween and disposed in a direction perpendicular to the recording means scan, for supporting the supporting member with the curved surface at one end thereof,
(ii) horizontal openings respectively formed in said vertical plates,
(iii) a second supporting means connected at one end thereof to the other end of said first supporting means by a coupling means, for supporting the roller at the other end of said second supporting means, and
(iv) pins affixed to said second supporting means and adapted to slidably move in said horizontal openings when said first supporting means is turned.

6. A recorder as defined in claim 5 wherein the coupling means comprises a hinged joint.

7. A recorder having a feed member and a take-up member positioned under stretched recording paper extending about a supporting member with a curved surface and a roller, the recording paper drawn out of a paper roll mounted on the feed member, progressively passing over the supporting member, the roller and being wound onto the take-up member, and the recorder having at least one recording means moving across the width of the recording paper, the improvments characterized by means for holding and simultaneously moving the supporting member and the roller so that at least one of the feed member and the take-up member can be removed and installed in the recorder from the upper side of the stretched recording paper, in which the holding and moving means comprises:
(i) supporting means rotatably supported by vertical plates therebetween and disposed in a direction perpendicular to the recording means scan, for supporting the supporting member with curved surface at one end thereof,
(ii) means rotatably supported around at least one of the axis of the take-up member and a point adjacent to the axis at one end thereof, for rotatably supporting the roller at the other end thereof, and
(iii) a bar rotatably secured at an end thereof to the other end of said second supporting means (ii) and rotatably secured at the other end thereof to said first supporting means (i).

8. A recorder as defined in claims 1, 3, 4, 5 or 7 wherein the supporting member with the curved surface comprises a roller.

9. A recorder as defined in claims 1, 3, 4, 5 or 7 wherein the supporting means comprises a plate.

10. In a recorder having a feed member and a take-up member positioned under stretched recording paper extending about a supporting member with a curved surface and a roller, the recording paper drawn out of a paper roll mounted on the feed member, and progressively passing over the supporting member, the roller and being wound onto the take-up member, and the recorder having at least one recording means moving across the width of the recording paper, the improvement characterized by:
- (i) a first gear rotatably coupled to a vertical plate placed in a direction perpendicular to the recording means scan,
- (ii) a second gear rotatably coupled to the vertical plate and meshed with said first gear,
- (iii) a first supporting means affixed to said first gear at one end thereof, for supporting the supporting member with the curved surface at the other end thereof,
- (iv) a second supporting means affixed to said second gear at one end thereof, for supporting the roller at the other end thereof,
- (v) a first suspension means for suspending the feed member from said first supporting means, and
- (vi) a second suspension means for suspending the take-up member from said second supporting means.

11. A recorder as defined in claim 10 wherein at least one of the feed member and the take-up member comprises reels.

12. A recorder as defined in claim 10 wherein at least one of the first and second supporting means has a portion at one end thereof to upwardly press the other supporting means when the recorder is set in a writing operational mode.

13. A recorder as defined in claims 10 or 12 wherein the supporting member with curved surface comprises a roller.

14. A recorder as defined in claims 10 or 12 wherein the supporting means comprises a plate.

15. In a recorder having a feed member and a take-up member positioned under stretched recording paper extending about a supporting member with a curved surface and a roller, the recording paper drawn out of a paper roll mounted on the feed member, and progressively passing over the supporting member, the roller and being wound onto the take-up member, and the recorder having at least one recording means moving across the width of the recording paper, the improvement characterized by:
- (i) a first supporting means rotatably supported by vertical plates therebetween and disposed in a direction perpendicular to the recording means scan for supporting the member with the curved surface at one end thereof,
- (ii) horizontal openings respectively formed in said vertical plates,
- (iii) a second supporting means connected at one end thereof to the other end of said first supporting means by a coupling means, for supporting the roller at the other end thereof,
- (iv) pins affixed to said second supporting means adapted to respectively move in said horizontal openings when said first supporting means is turned,
- (v) a first suspension means for suspending the feed member from said first supporting means, and
- (vi) a second suspension means for suspending the take-up member from said second supporting means.

16. A recorder as defined in claim 15 wherein at least one of the feed member and the take-up member comprises reels.

17. A recorder as defined in claim 15 wherein the coupling means comprises a hinged joint.

18. A recorder as defined in claim 15 wherein the supporting member with the curved surface comprises a roller.

19. A recorder as defined in claim 15 wherein the supporting means comprises a plate.

20. A device for changing paper in a recorder comprising:
- (A) a lateral support plate with a horizontally extending slot;
- (B) a roller supported by a movable guide pin in the horizontally extending slot;
- (C) a vertical support member, and
- (D) a cover plate connected at one end to the roller and at the other end to the vertical support member, so that when said vertical support member is lifted vertically, said roller and guide pin move horizontally inwardly along said horizontally extending slot, and said cover plate is raised upwardly in the direction of said vertical support member.

21. The device of claim 20 comprising:
- (A) a pair of lateral support plates with horizontally extending slots;
- (B) a pair of rollers supported by movable guide pins in the horizontally extending slots;
- (C) a vertical support member positioned between the lateral support plates; and
- (D) a pair of cover plates, each plate connected at one end to one of the pair of rollers and connected at the other end to the vertical support member, so that when said vertical support member is lifted vertically, said rollers and guide pins move horizontally inwardly along said horizontally extending slots toward each other, and said cover plates are raised upwardly in the direction of said vertical support member.

22. The device of claim 21 additionally comprising a pair of springs, each spring positioned between said vertical support member and one of the pair of cover plates to foster raising of the cover plates with the vertical support member.

23. The device of claim 22 wherein said cover plates are connected to said vertical support member by a hinged arrangement.

24. The device of claim 23 wherein said vertical support member is substantially rectangular parallelpiped in shape.

25. The device of claim 25 additionally comprising a spring and arm to press recording paper against one of the pairs of rollers.

26. A device for changing paper in a recorder comprising:
- (A) a roller;
- (B) a cover plate;
- (C) a first arm supporting said roller and connected to a second roller;
- (D) a second arm connected at one end to said first arm so that said roller is rotatable about said second roller, and connected at the other end to said cover plate; and
- (E) a horizontally-extending bar rotatably supporting said cover plate, so that when said cover plate is rotated about said horizontally-extending bar, said roller (A) is rotated in the opposite direction and toward said cover plate.

27. The device of claim 26 wherein said second arm and said horizontally-extending bar are connected to said cover plate with brackets.

28. The device of claim 27 additionally comprising a spring and arm to press recording paper against said roller.

29. A device for changing paper in a recorder comprising:
   (A) a pair of cover plates, and
   (B) a pair of meshed gears, each gear connected to an end of a cover plate,
   so that when the gears are rotated in respective clockwise and counter-clockwise directions, the cover plates are rotated upwardly toward each other.

30. The device of claim 29 additionally comprising a pair of rollers with each roller positioned on an end of a cover plate opposite the end connected to the gear.

31. The device of claim 30 additionally comprising a pair of suspension plates, each suspension plate affixed underneath a respective cover plate, and a pair of reels, each reel supported by a respective suspension plate at an end opposite the cover plate,
   so that said reels and suspension plates are rotated upwardly with said cover plates.

32. The device of claim 31 additionally comprising a spring and arm to press recording paper against one of said rollers.

33. The device of claims 29 or 31 wherein one of said pair of cover plates additionally comprises a curved extension at one end thereof to engage the underside of other cover plate when said plates are in fully extended positions to eliminate longitudinal vibration of the cover plates.

34. A device for changing paper in a recorder comprising:
   (A) a lateral support plate with a horizontally-extending slot;
   (B) a pair of cover plates connected with one another by a flexible coupling means;
   (C) a horizontally-extending rod rotatably supporting one of said pair of cover plates; and
   (D) a movable guide pin connected to said other cover plate and positioned within the horizontally-extending slot of said lateral support plate,
   so that when said first cover plate is rotated upwardly about said rod, said guide pin moves inwardly along said horizontally-extending slot toward said first cover plate and said other cover plate is also rotated upwardly in the opposite direction towards said first cover plate.

35. The device of claim 34 wherein the flexible coupling means is a hinged arrangement.

36. The device of claim 35 additionally comprising a pair of rollers with each roller positioned on an end of a cover plate opposite the end connected to the hinged arrangement.

37. The device of claim 36 additionally comprising a pair of suspension plates, each suspension plate affixed underneath a respective cover plate, and a pair of reels, each reel supported by a respective suspension plate at an end opposite the cover plate,
   so that said reels and suspension plates are rotated upwardly with said cover plates.

* * * * *